United States Patent Office 3,483,035
Patented Dec. 9, 1969

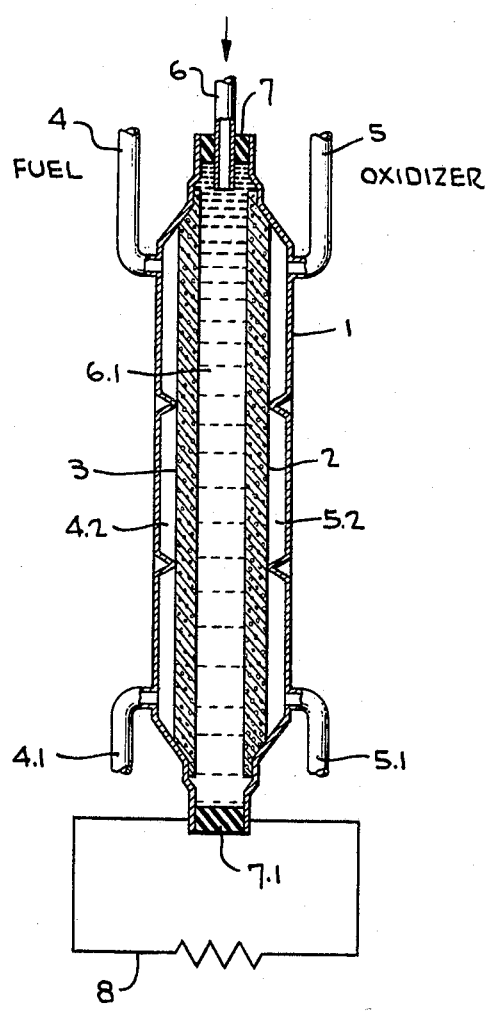

3,483,035
ELECTROCHEMICAL CELL CONTAINING ALKALI-METAL HYDROXIDE ELECTROLYTE AND METHOD OF PRODUCING ELECTRICAL ENERGY
Reiner H. Kollrack, Glastonbury, Conn., assignor, by mesne assignments, to Leesona Corporation, Cranston, R.I., a corporation of Massachusetts
Filed Sept. 30, 1965, Ser. No. 491,763
Int. Cl. H01m 27/00, 11/00, 27/22
U.S. Cl. 136—86      2 Claims

ABSTRACT OF THE DISCLOSURE

A cell for the generation of electrical energy comprising an anode, a cathode and an aqueous admixture of potassium hydroxide and cesium hydroxide and/or rubidium hydroxide electrolyte is described. The potassium hydroxide and cesium hydroxide and/or rubidium hydroxide have a synergistic effect on the other component.

---

This invention relates to improved fuel cells and more particularly to fuel cells utilizing mixtures of potassium hydroxide and cesium hydroxide or potassium hydroxide and rubidium hydroxide as the electrolyte. Such cells provide enhanced electrochemical performance characteristics in comparison to potassium hydroxide, and are substantially equal in performance in comparison to pure rubidium hydroxide and cesium hydroxide electrolytes.

A fuel cell, as defined herein, is a device which converts the energy of a chemical reaction between a fuel and oxidant directly into low voltage, direct current electricity. In obtaining an efficient fuel cell, the problems encountered are essentially problems of chemical kinetics. It is necessary that the reaction between the fuel and oxidant be accomplished in order that the amount of energy degraded into heat is as small as possible. At the same time, the reation rate of the cell must be high enough to economically produce sufficient current from a cell of practical size.

Such cells in their simplest form comprise a fuel electrode, an oxidizing electrode, an electrolyte positioned between the electrodes and means for the introduction of fuel and oxidant to the respective electrodes. In operation, when employing an alakaline electroltye, air or oxygen is forced into the oxidizing electrode where the oxidant reacts with the electroltye within the pores of the electrode. Negative ions are formed and transferred to the anode. At the anode or positive side of the cell, fuel enters and impinges on the electrode where the transferred negative ions react to form a neutral product.

It is recognized in the art that when employing an oxygen or an air electrode, the current provided by the cell is in part limited by the rate of diffusion of the oxidant through the electrolyte to the surface of the electrode. Therefore, in the construction of a practical cell, this diffusion feature is a critical factor. Additionally, in order to have a cell with a reasonable lifetime, the electrolyte must not unduly corrode the electrodes, or other components of the cell.

It was found, as set forth in Rockette and Brown, commonly assigned co-pending application Ser. No. 399,274, filed Sept. 25, 1964, now abandoned, that a rubidium hydroxide electrolyte provides improved electro-chemical performance in a fuel cell in comparison with potassium and sodium hydroxide electrolytes. Apparently, the improved electro-chemical performance is first a result of the high rate of diffusion of oxygen through the rubidium hydroxide electrolyte due to the superior mediation of the rubidium; and, secondly, it is a result of the decrease of energy necessary to break the oxygen-oxygen bond.

The former theory has support in that it has been found that rubidium hydroxide has substantially the same solubility in a given system as lithium or potassium hydroxide. The reason for the decrease of the energy necessary to break the oxygen-oxygen bond, which results in a decrease of the activation polarization of the cell, can probably be explained in that potassium superoxide ($KO_2$) and especially rubidium superoxide ($RbO_2$) and cesium superoxide ($CsO_2$) decompose into an atom of oxygen and alkali peroxide (i.e., KO, RbO, CsO) under temperatures as applied in the described fuel cells. Furthermore, it is known that these mentioned alkalis, hydroxides, and oxygen form superoxides under conditions as applied here, while sodium hydroxide and lithium hydroxide do not form the superoxides under the same conditions. It is probably due to this peroxide formation which causes sodium hydroxide and lithium hydroxide electrolytes to provide comparatively bad cell performances. Unfortunately, an excess of free (unbound) water effectively prevents the formation of these superoxides. This is probably the reason for improved cell performances at lower water contents. Therefore, it is assumed that the oxygen molecule forms superoxides only with water-free alkali ions. However, the current density at a set voltage is substantially greater when using rubidium hydroxide as the electrolyte than it is with potassium hydroxide in an otherwise identical cell based on equal molar solutions.

Rubidium hydroxide has disadvantages as an electrolyte in that it is considerably heavier than potassium hydroxide, detracting from its use particularly in spaced applications. Furthermore, for commercial applications, the higher cost of rubidium hydroxide at least partially offsets its advantages over potassium hydroxide. It has now been found that quite unexpectedly mixtures of potassium hydroxide and cesium hydroxide or mixtures of potassium hydroxide and rubidium hydroxide provide electrochemical performance equal to or substantially equal to pure rubidium hydroxide or cesium hydroxide when employed in a fuel cell as the electrolyte.

It is an object of the invention, therefore, to provide an improved fuel cell electrolyte comprising admixtures of rubidium hydroxide and potassium hydroxide or cesium hydroxide and potassium hydroxide.

These and other objects of the invention will become more fully apparent from the following detailed description, with particular emphasis being placed on the illustrative example and drawing.

Although I do not wish to be bound by an explanation as to why the aforesaid admixtures of potassium hydroxide provide results which are substantially equivalent to results obtained with pure rubidium or cesium hydroxide as electrolytes, it is theorized that since cesium hydroxide and rubidium are more strongly basic than potassium hydroxide, a certain amount of the $K^+$ and $OH^-$ ions will form undissociated KOH after the addition of cesium hydroxide or rubidium hydroxide while a certain amount of cesium hydroxide and rubidium hydroxide will dissociate into $C_s^+$ and $Rb^+$ and $OH^-$ ions. More specifically, the $C_s^+$ and $Rb^+$ ion concentration is increased while the $K^+$ ion concentration is decreased. Thus, the ratio of $C_{Cs+}/C_{K+}$ or $C_{Rb+}/C_{K+}$ is considerably greater than $C_{CsOH}/C_{KOH}$ or $C_{RbOH}/C_{KOH}$. That is, the apparent dissociation between cesium hydroxide and rubidium hydroxide is greater than in a pure cesium hydroxide or rubidium hydroxide solution since a portion of the hydroxyl ions is trapped by the formation of undissociated potassium hydroxide. Furthermore, because of their size, potassium hydroxide and potassium ions trap the available water molecules easier than cesium hydroxide or rubidium hydroxide and cesium and rubidium ions. Accordingly, relatively fewer water molecules will be attached to the free cesium and rubidium ions. Stated in another way, the distribution of water molecules being attached to cesium and rubidium ions and the remaining molecular entities of the solution will be changed so that relatively fewer cesium and rubidium ions have a water molecule attached. Therefore, there will be almost the same free cesium and rubidium ion concentration present in a mixture with potassium hydroxide as in a pure cesium hydroxide or rubidium hydroxide electrolyte. The above explanation is believed to account for the fact that the aforesaid potassium hydroxide admixtures provide as good, or substantially as good, electrochemical preformance as with the pure cesium hydroxide or rubidium hydroxide electrolytes. On the other hand, unlike pure cesium or rubidium hydroxide electrolytes, the total weight of the electrolyte is much less as is the total cost.

According to the present invention, the ratio of potassium hydroxide to cesium hydroxide or rubidium hydroxide is not overly critical. However, in order to obtain the maximum benefits of the invention, the electrolyte mixtures preferably contain from 30 to 85 percent potassium hydroxide and from 70 to 15 percent cesium or rubidium hydroxide on a weight basis. The electrolyte must contain from about 15 to 40 percent water. The selection of a particular content of electrolyte will depend at least partially upon the operating temperature of the cell, and upon the desired electrochemical performance. The optimum ratio of potassium hydroxide to rubidium or cesium hydroxide is about 40 to 70 percent potassium hydroxide and from 60 to 30 percent cesium hydroxide or rubidium hydroxide on a weight basis. The preferred percentage of water in the electrolyte is approximately 30 percent.

Cells employing the present electrolytes can be operated with either air or oxygen as the oxidant. Furthermore, any of the prior art fuels such as hydrogen, ammonia, carbon monoxide, methanol, methane, and propane can be employed. The particular fuel selected does not form a part of the instant invention, the proper selection of the fuel being within the ability of one skilled in the art.

The novel fuel cell is particularly advantageous in that it will function satisfactorily at low operating temperatures. Thus, the instant cell will provide satisfactory current densities at temperatures of from about 20° C. to 650° C. However, the cell performs most satisfactorily at temperatures of from about 120° C. to 250° C. with the optimum operating temperatures being from about 200° C. to 250° C. At higher operating temperatures, it is found that the deterioration of the electrodes occurs at a much higher rate.

The electrodes commonly used in the art are suitable for use in the presently described fuel cells. Thus, homoporous and bi-porous structures including those described by Francis T. Bacon in U.S. Patent No. 2,716,670, which are nickel electrodes having a surface coating of lithiated nickel oxide, are particularly advantageous. Other operable electrodes include carbon substrate or silver activated carbon substrate electrodes as well as silver or silver alloy electrodes. Additionally, the nonporous palladium silver alloy electrodes described in Oswin, U.S. Patent No. 3,092,517, can be chosen. The proper selection of a suitable electrode depends upon such factors as the fuel and oxidant employed and the materials which are commercially available.

Having described the invention in general terms, a preferred embodiment will be set forth with reference to the cell illustrated in the drawing. Thus, the cell comprises a metal housing 1, an oxidizing electrode 2, a fuel electrode 3, fuel inlet and outlet means 4 and 4.1, oxidant inlet and outlet means 5 and 5.1, and opening 6 for adding electrolyte 6.1. Housing 1 and electrodes 2 and 3 provide fuel compartment 4.2 and oxidant compartment 5.2. The electrodes are separated by suitable insulation 7 and 7.1. The electrical current produced in the cell is withdrawn by external circuit 8.

In the construction of the cell, the electrodes are spaced 0.125″ apart. Hydrogen is fed to the fuel electrode and oxygen is fed to the oxidizing electrode at 10 p.s.i.g. The cell was operated at a temperature of 450° F. with an electrolyte comprising an aqueous solution containing 30 percent water, 45 percent potassium hydroxide, and 25 percent rubidium hydroxide. The cell provided a curren density of 150 ma./cm.$^2$ at .975 volt.

A cell constructed identical to that described above but employing an electrolyte comprising 35 percent water, 40 percent potassium hydroxide, and 25 percent cesium hydroxide provided a current density of 150 ma./cm.$^2$ at a voltage of .970 volt.

Although the present description is concerned with potassium hydroxide in admixture with rubidium or cesium hydroxide, it has been found that sodium hydroxide in admixture with rubidium and cesium hydroxide also demonstrates substantial superiority over sodium hydroxide when employed above as the electrolyte.

While various modifications of the invention are disclosed, it should be appreciated that the invention is not restricted thereto but that other embodiments will be apparent to one skilled in the art which come within the scope and spirit of the invention and the appended claims.

It is claimed:

1. An improved electrochemical cell for the generation of electrical energy comprising an anode, a cathode and an electrolyte separating said anode and cathode, at least the cathode being non-consumable, wherein the electrolyte is an aqueous solution containing from 15 to 40 percent water consisting essentially of an admixture containing from 30 to 85 percent potassium hydroxide and from 70 to 15 percent of a member of the group consisting of rubidium hydroxide and cesium hydroxide.

2. The method of producing electrical energy by the reaction of an oxidant and a fuel in an electrochemical cell having an anode and a cathode in contact with an aqueous solution containing from 14 to 40 percent water and containing from 30 to 85 percent potassium hydroxide and from 70 to 15 percent cesium hydroxide and/or rubidium hydroxide comprising the steps of feeding at least an oxidant to said cathode and maintaining the cell at an operating temperature of from 20 to 250° C.

References Cited

UNITED STATES PATENTS

| 2,683,102 | 7/1954 | Coolidge | 136—154 |
|---|---|---|---|
| 3,119,723 | 1/1964 | Crouthamel et al. | 136—86 |
| 3,297,484 | 1/1967 | Niedrach | 136—86 |
| 3,350,226 | 10/1967 | Lieb et al. | 136—86 |
| 3,269,867 | 8/1966 | Fabel et al. | |
| 3,317,349 | 5/1967 | Elliott et al. | 136—86 |

A. B. CURTIS, Primary Examiner

U.S. Cl. X.R.

136—154

PO-1050
(5/69)

UNITED STATES PATENT OFFICE
CERTIFICATE OF CORRECTION

Patent No. 3,483,035  Dated December 9, 1969

Inventor(s) Reiner H. Kollrack

It is certified that error appears in the above-identified patent and that said Letters Patent are hereby corrected as shown below:

Column 1, line 39 delete "reation", and insert -- reaction --;

Column 1, line 46 delete "alakaline", and insert -- alkaline --;

Column 1, line 62 delete "Rockette", and insert -- Rockett --;

Column 2, line 30 delete "spaced", and insert -- space --;

Column 4, line 17 delete "ren", and insert -- rent --;

Column 4, line 47 delete "14", and insert -- 15 --.

SIGNED AND
SEALED
OCT 13 1970

(SEAL)
Attest:

Edward M. Fletcher, Jr.
Attesting Officer

WILLIAM E. SCHUYLER, JR
Commissioner of Patents